United States Patent [19]
Meyer

[11] Patent Number: 5,257,149
[45] Date of Patent: Oct. 26, 1993

[54] DISC DRIVE WITH OFFSET ADDRESS FIELD

[75] Inventor: Forrest C. Meyer, Eden Prairie, Minn.

[73] Assignee: Seagate Technology, Inc., Scotts Valley, Calif.

[21] Appl. No.: 654,900

[22] Filed: Feb. 13, 1991

[51] Int. Cl.$^5$ .............................. G11B 5/596
[52] U.S. Cl. ...................... 360/78.14; 360/77.02; 360/77.05; 360/78.04; 360/78.08
[58] Field of Search ............ 360/78.14, 77.02, 77.05, 360/78.04, 78.08

[56] References Cited

U.S. PATENT DOCUMENTS

| | | | |
|---|---|---|---|
| 3,474,432 | 10/1969 | Sevilla | 340/174.1 |
| 3,903,545 | 9/1975 | Beecroft et al. | 360/97 |
| 4,068,269 | 1/1978 | Commander et al. | 360/78.14 |
| 4,085,427 | 4/1978 | Dunn | 360/77 |
| 4,396,960 | 8/1983 | Matla et al. | 360/77 |
| 4,472,750 | 9/1984 | Klumpp et al. | 360/78 |
| 4,513,331 | 4/1985 | Baker et al. | 360/75 |
| 4,530,020 | 7/1985 | Sutton | 360/77 |
| 4,575,775 | 3/1986 | Albrecht | 360/77 |
| 4,630,190 | 12/1986 | Alaimo et al. | 364/167 |
| 4,633,345 | 12/1986 | Keener | 360/78.14 |
| 4,683,504 | 7/1987 | Cantello et al. | 360/78 |
| 4,700,244 | 10/1987 | Fasen et al. | 360/77 |
| 4,729,048 | 3/1988 | Imakoshi | 360/103 |
| 4,789,909 | 12/1988 | Moteki | 360/78.14 |
| 4,802,033 | 1/1989 | Chi | 360/77.04 |
| 4,805,051 | 2/1989 | DeMarco et al. | 360/78.01 |
| 4,833,551 | 5/1989 | Song | 360/77.05 |
| 4,851,933 | 7/1989 | Sugaya et al. | 360/61 |
| 4,862,295 | 8/1989 | Tanaka et al. | 360/48 |
| 4,865,114 | 10/1989 | Moteki | 360/77.08 |
| 4,875,114 | 10/1989 | Moteki | 360/78.14 |
| 4,903,151 | 2/1990 | Mizukami et al. | 360/78.01 |
| 4,953,161 | 8/1990 | Toyama | 360/77.12 |
| 4,984,100 | 1/1991 | Takayama et al. | 360/78.14 |
| 5,073,833 | 12/1991 | Best et al. | 360/77.05 |
| 5,170,299 | 12/1992 | Moon | 360/78.14 |

OTHER PUBLICATIONS

IBM Technical Disclosure Bulletin, "Compensation for Element-to-Element Misregistration in a Dual Element Head," vol. 17, No. 1, Jun. 1974.
IBM Technical Disclosure Bulletin, "Read/Write Servo Magnetic Head," vol. 20, No. 9, Feb. 1978.
IBM Technical Disclosure Bulletin, "Transducer Control for Search Servo," vol. 21, No. 5, Oct. 1978.

*Primary Examiner*—William L. Sikes
*Assistant Examiner*—Scott A. Ouelette
*Attorney, Agent, or Firm*—Kinney & Lange

[57] ABSTRACT

An offset address field in a magnetic disc storage system which uses a dual gap head and a rotary actuator. The dual gap head has two gaps, one for reading information and the other for writing information. Prior to a write operation, an address field which precedes a data field is read. The rotary actuator introduces a skew angle between the head and a data track. The skew angle causes the two gaps to travel along different radii of the storage disc. A read address field is aligned with the data field and a write address field is offset from the data field. Prior to writing data on the disc surface, the head is offset so that the write address field is read. Since the write address field is offset, a write operation can proceed without any further offset to the magnetic head.

17 Claims, 6 Drawing Sheets

DISC DRIVE WITH OFFSET ADDRESS FIELD

BACKGROUND OF THE INVENTION

The present invention relates to magnetic storage systems. In particular, the present invention relates an addressing format for a magnetic disc storage system.

Magnetic disc drive systems have become widely accepted in the computer industry as a cost effective and reliable form of data storage. The advantages of disc drive technology over other means of data storage include increased data transfer rate and storage capacity. These two goals are motivating forces of disc drive technology.

In a magnetic disc drive storage system, a magnetic disc rotates at high speed while a magnetic read/write head "flies" over the surface of the rotating disc. As the disc rotates, aerodynamic properties cause the magnetic head to glide on a cushion of air suspended over a surface of the disc. The storage disc carries information on concentric data tracks. Information can be retrieved from the disc surface by moving the magnetic head between data tracks.

In general, there are two types of actuators which are used to position the magnetic head over the disc surface. These two types are linear and rotary actuators. A linear actuator moves back and forth linearly, in a radial direction from the center of the rotating disc. Rotary actuators, however, require less space than linear actuators. A rotary actuator works much like a tone arm on a record player. A rotary actuator positions the magnetic head along an arc over the surface of the magnetic disc. This can introduce a skew angle between the magnetic head and the data tracks.

A dual gap magnetic head uses a read gap for reading information and a write gap for writing information. Dual gap magnetic heads allow magnetic head designers to optimize the performance of the read gap for reading information and the write gap for writing information. For example, a magnetoresistive head uses a read gap for a magnetoresistive readback element and a write gap for inductively writing magnetically encoded information. Design constraints require that the two gaps be physically separated from each other.

Performance of a dual gap magnetic head can be optimized for a particular data track on a magnetic disc by aligning the write gap with the data track when writing information and aligning the read gap with the data track when reading information. Using a linear actuator, this is not a problem. However, a rotary actuator introduces a skew angle between data tracks and that axis of a dual gap head which provides optimum performance. For example, a dual gap head having 320 micro inches of separation between the two gaps and a 9° skew angle with a data track will have an offset of 50 micro inches.

An actuator controller which controls positioning of the actuator can compensate for the skew angle introduced by a rotary actuator. Still, the skew angle significantly limits the time required to write information. This limitation is due to the format used in storing data on data tracks of the magnetic disc. Typically, a data track is formatted with an address field followed by a data field. The address field contains information which relates to head position and data field integrity, and therefore the address field must be read before the data field is written. Prior to writing information in a data field, the magnetic head must be repositioned because of the offset introduced by the skew angle. This can require from 0.5 micro seconds to 1.5 micro seconds. In fact, in a high speed magnetic disc storage system the head may be required to wait an entire revolution of the disc before writing information.

SUMMARY OF THE INVENTION

The present invention is an offset address field which permits faster data transfer when writing information with a dual gap head which uses a rotary actuator.

In the present invention, each data field includes two address fields. A first address field is aligned with a read field on a data track, and is used during a read operation. A second address field is offset from the data track, and is used during a write operation. Prior to writing data on the disc surface, a disc controller issues a "read the write address field" command. This causes the magnetic head to be offset so that the offset address field is read. Since this address field is offset from the data track, the write operation can proceed without any further offsetting of the magnetic head.

DETAILED DESCRIPTION OF THE PREFERRED EMBODIMENTS

Figure 1:
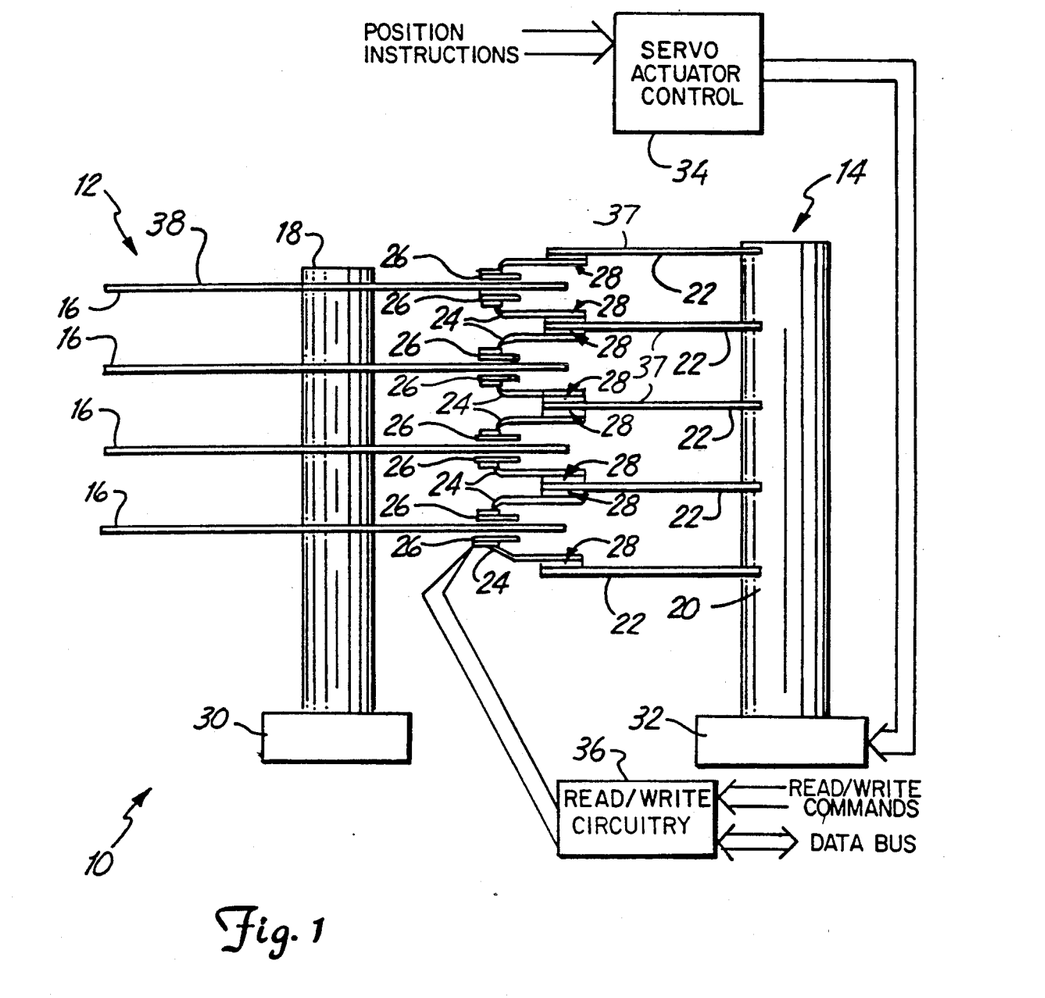
FIG. 1 shows a magnetic disc storage system.

FIG. 1 shows a disc drive 10 which includes a disc pack 12 and an E-block assembly 14. Disc pack 12 carries discs 16, which are stacked on a drive spindle 18. E-block assembly includes a servo spindle 20 and a plurality of rotary arms 37. Each rotary arm 37 comprises a support arm 22 which carries one or two flexure arms 24. Each flexure arm 24 includes a magnetic head assembly 26. Each flexure arm 24 is connected to a corresponding support arm 22 by a mount 28. A spindle motor 30 is connected to drive spindle 18. An actuator 32 is coupled to servo spindle 20. A servo actuator control 34 receives positioning instructions and connects to actuator 32. Each magnetic head assembly 26 connects to read/write circuitry 36. Read/write circuitry 36 connects to a data bus for carrying information during reading and writing operations.

In operation, motor 30 rotates drive spindle 18 which causes discs 16 to rotate in unison. Actuator 32 moves servo spindle 20 so that magnetic head assemblies 26 move between data tracks on each disc 16. Read/write circuitry 36 converts a raw data signal from magnetic head 26 into digital data pulses. Servo actuator controller 34 receives position instructions and controls actuator 32 based upon these position instructions. Read/- write circuitry 36 receives information from a data bus and writes in onto a surface of a disc 16 using a magnetic head assembly 26. Read/write circuitry 36 is also used for reading information from the surface of disc 16 and providing the information to the data bus. Read/write circuitry 36 reads or writes data as a function of read/write commands.

Figure 2:
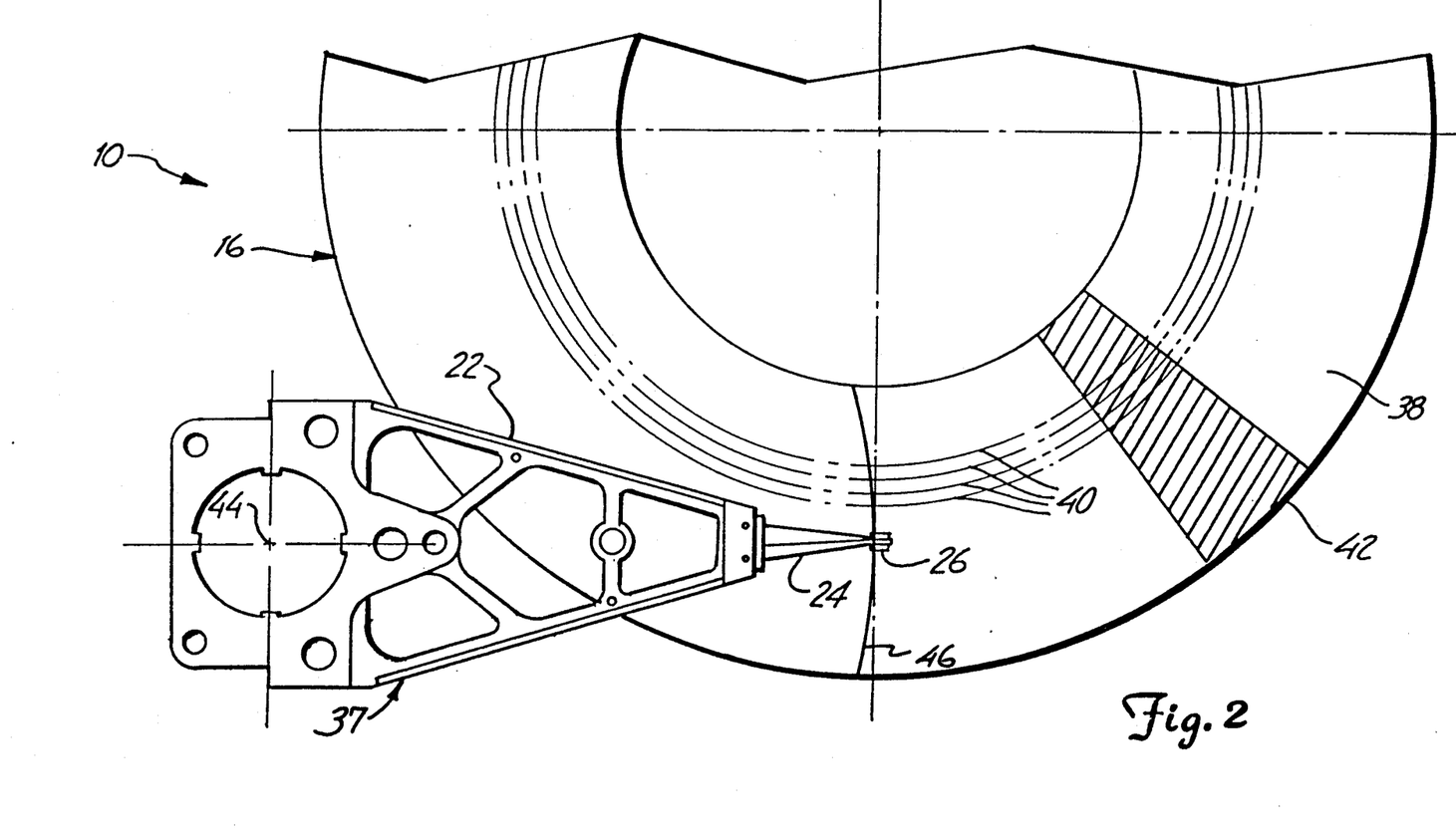
FIG. 2 is a top plan view of a support arm and a magnetic disc.

FIG. 2 is a top plan view of magnetic storage system 10. A rotary arm 37 is shown positioned over a surface 38 of magnetic storage disc 16. Surface 38 is divided into data tracks 40 and data sectors 42.

Rotary arm 37 rotates about an access of rotation 44. By rotating rotary arm 37 about axis of rotation 44, slider 26 moves between adjacent tracks 40 of storage disc 16. This causes magnetic head assembly 26 to move along an arc 46 and shift between data tracks 40 on disc 16.

Figure 3:
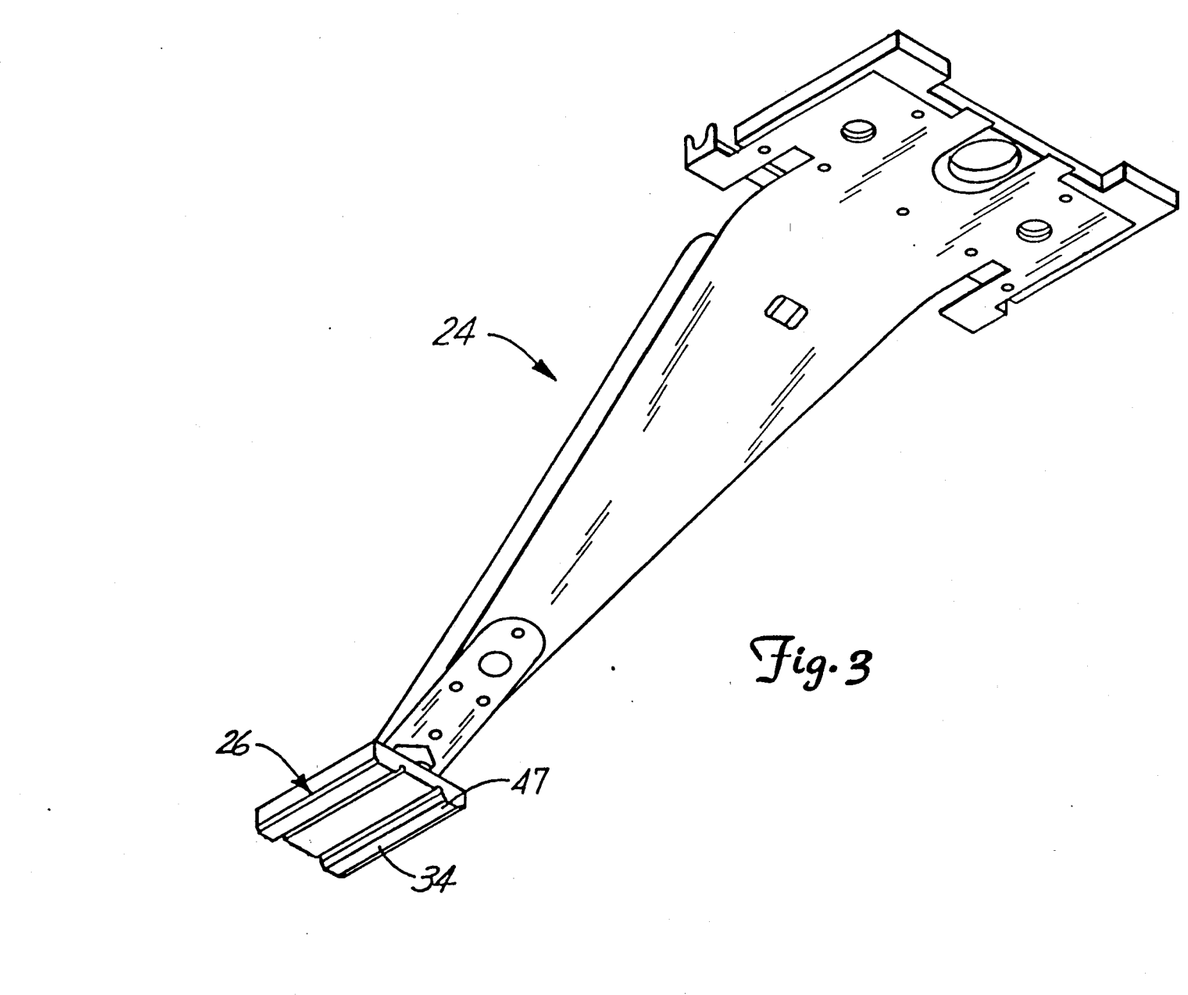
FIG. 3 is a perspective view of a flexure arm and a slider.

FIG. 3 is a perspective view of flexure arm 24. Flexure arm 24 carries magnetic head assembly 26. Magnetic head assembly 26 includes a slider 47 having aerodynamic properties which allow it to fly over the surface of storage disc 16. Flexure arm 24 is spring loaded and opposes aerodynamic lift from slider 47.

Figure 4:
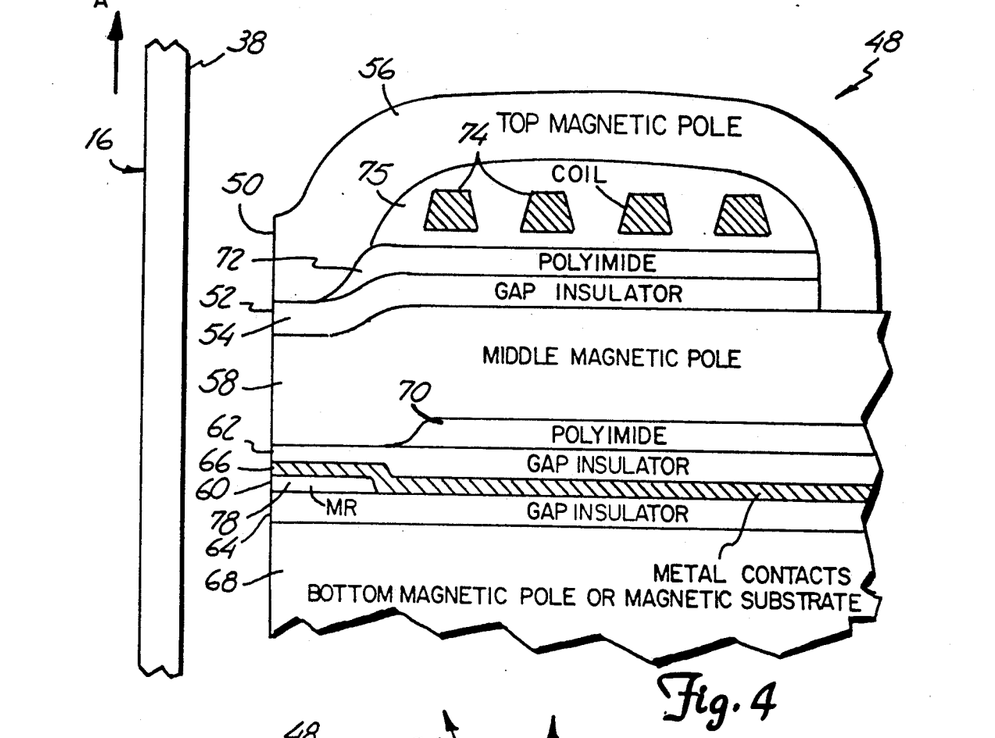
FIG. 4 is a cross-sectional view of a double gap magnetoresistive head.

FIG. 4 is a cross-sectional view of a double gap magnetoresistive sensor 48 in a disc drive environment. Magnetoresistive sensor 48 is carried on slider 47 (shown in FIG. 3). Magnetoresistive sensor 48 has an air bearing surface 50 which meets exacting tolerances for flatness and degree of polish. Air bearing surface 50 is formed by lapping magnetoresistive sensor 48.

Air bearing surface 50 faces surface 38 of magnetic storage disc 16. Magnetic storage disc 16 travels in a direction relative to magnetoresistive sensor 48 as indicated by arrow A. A spacing between air bearing surface 50 and disc surface 38 is preferably minimized while avoiding contact between magnetoresistive sensor 48 and magnetic disc 16. A write gap 52 is defined on air bearing surface 50 by gap insulator layer 54 between terminating ends of a top magnetic pole 56 and a middle magnetic pole 58. A read gap 60 is defined on air bearing surface 50 by gap insulator layers 62 and 64, and metal contact layer 66 between terminating ends of middle magnetic pole 58 and bottom magnetic pole or magnetic substrate 68.

An optional polymer (polyimide) layer 70 overlays a portion of gap insulator layer 62 away air bearing surface 50. Middle magnetic pole 58 overlays polymer layer 70 and gap insulator layer 62. Write gap insulator layer 54 and polymer layers 72 and 75 space middle magnetic pole 58 from the top magnetic pole 56. Electrically conductive coils 74 are provided for generating magnetic fields across write gap 52 and are positioned in polymer layer 75. A magnetoresistive sensor layer 78 is positioned between gap insulator layer 64 and metal contact 66.

Figure 5:
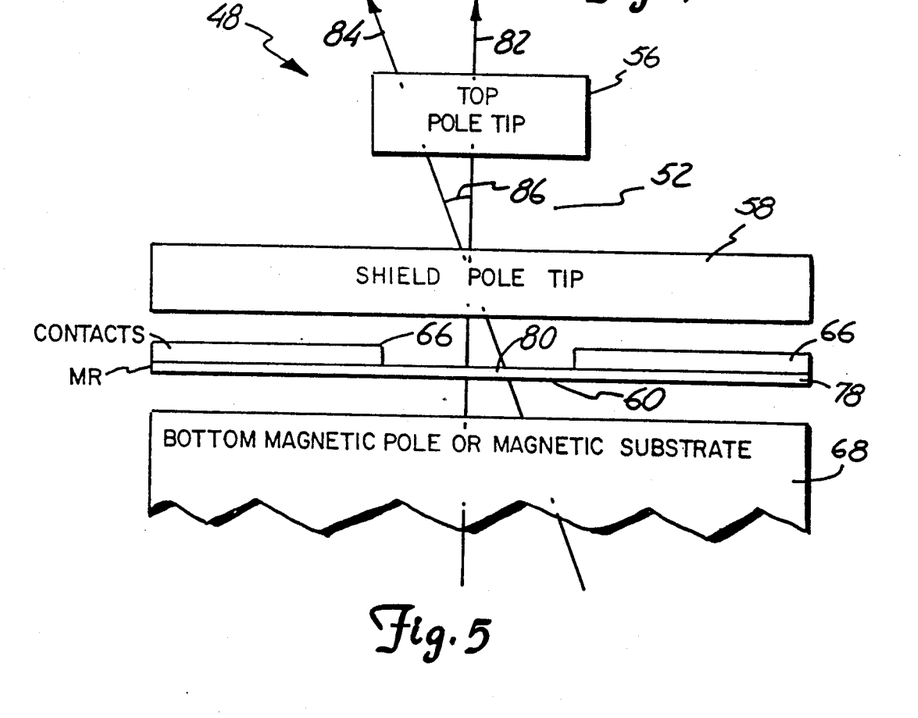
FIG. 5 is an end view of magnetically significant elements of a double gap magnetoresistive head.

FIG. 5 illustrates the location of magnetically significant components of magnetoresistive sensor 48 as they appear looking toward air bearing surface 50. Spacing and insulating layers are omitted for clarity. Bottom magnetic pole or substrate 68 and middle magnetic pole 58 are spaced apart and provide a shielded gap in which magnetoresistive sensor element 80 is disposed. Magnetoresistive sensor element 80 comprises that portion of magnetoresistive layer 78 between metal contact 66 which define the width of sensor 80. Top magnetic pole 56 is depicted as being of substantially less width and about the same thickness as middle magnetic pole 58. This arrangement protects magnetoresistive sensor element 80 from interference arising from stray magnetic fields generated across from the write gap between top pole 56 and middle pole 58.

Arrow 82 in FIG. 5 represents a rotational velocity vector of storage disc 16 when magnetoresistive head 48 is aligned with data tracks 40. Vector 84 in FIG. 5 shows a rotational velocity vector of magnetic disc 16 when magnetoresistive sensor is skewed at angle 86 which arises because magnetoresistive head 48 is moved between data tracks 40 along an arc 46. Skew angle 86 causes an alignment error between the reading gap 60 and the writing gap 52 of magnetoresistive head 48 and data tracks 40 of magnetic disc 16.

Figure 6:
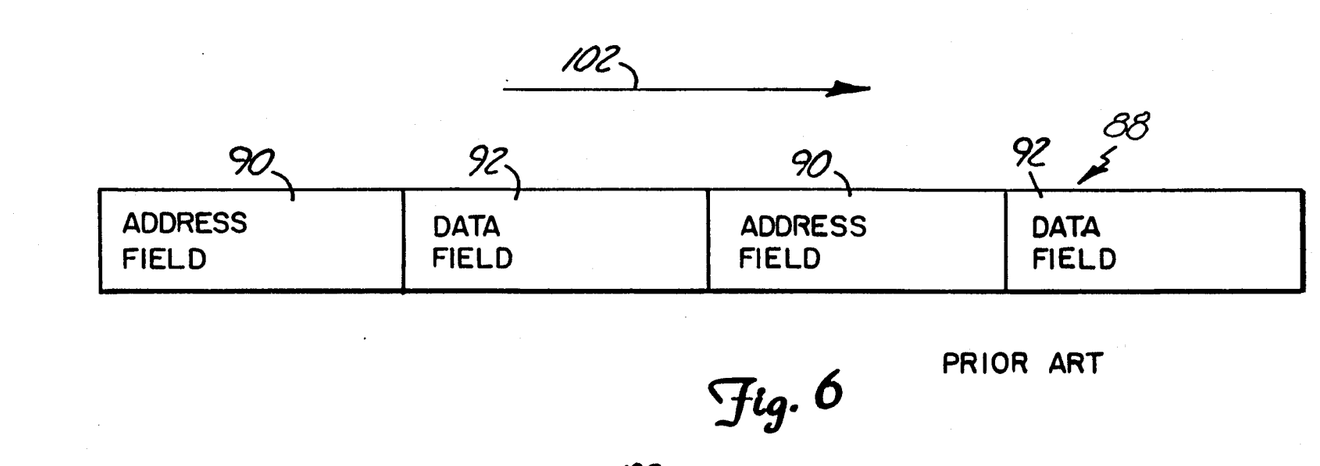
FIG. 6 is a schematic diagram of a prior art format for a data track in a magnetic disc storage system.

FIG. 6 is a schematic diagram of a prior art data track 88. Data track 88 includes address fields 90 and data fields 92. Magnetoresistive head 48 travels along data track 88 in a direction indicated by arrow 102. If magnetoresistive head 48 travels along prior art data track 88 at a skew angle 86, it is impossible for both the read gap and the write gap of magnetoresistive head 48 to be aligned simultaneously with data track 88. Prior to writing information in data field 92, address field 90 must be read. Address field 90 contains position information and information which relates to the integrity of the succeeding data field 92. Therefore, it is necessary to realign magnetoresistive head 48 after reading address field 90 and prior to writing data field 92. If magnetic storage disc 16 has a high data density and if disc 16 rotates at a high speed, realigning the head for a write operation may require disc 16 to go through an entire revolution.

Figure 7:
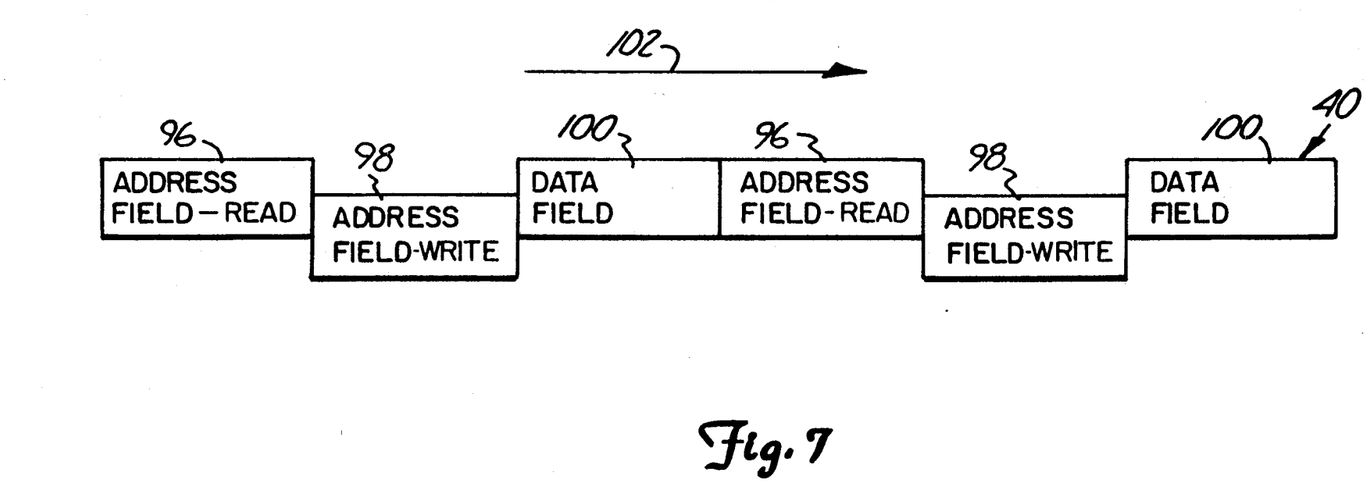
FIG. 7 is a schematic diagram of a format of a data track of a magnetic disc storage system, in accordance with the present invention.

FIG. 7 is a schematic diagram of data track 40 formatted in accordance with the present invention. Data track 40 includes read address fields 96, write address fields 98 and data fields 100. Data track 40 is shown in schematic form and actually forms an arc. Magnetoresistive head 48 travels along data track 40 in a direction indicated by arrow 102. During a readback operation, write address field 98 is not used. The read gap of magnetoresistive head 48 reads address field 96 followed by data field 100. During readback, it is not necessary to offset magnetoresistive head 48. During a write operation, magnetoresistive head 48 is offset from data track 40 so that the read gap of magnetoresistive head 48 is positioned over write address field 98. This causes the write gap of magnetoresistive head 48 to be aligned with data field 100. Therefore, following reading of address field 98, data field 100 can be written without any further offset of magnetoresistive head 48.

Magnetoresistive head 48 is offset to read address field 98 during a write operation using servo actuator control circuitry 34 shown in FIG. 1. When writing data, a controller issues a "read the write address field" command. This causes actuator 32 to offset magnetic head assembly 26 so that address field 98 is read. The degree of offset of write address field 98 will vary depending upon its distance from the center of disc 16 and the path formed by arc 46 shown in FIG. 2. The amount of offset is a function of skew angle, radial position of the head, or position of the data track relative to the disc.

Figure 8:
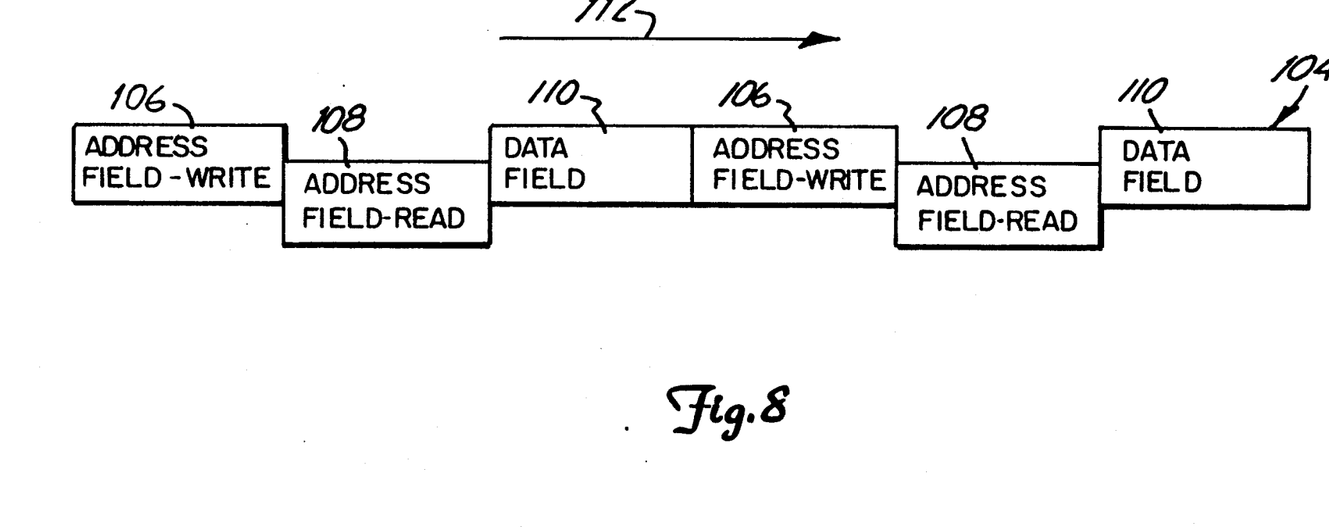
FIG. 8 is a schematic diagram of a data track of a magnetic storage disc system which shows another embodiment of the present invention.

FIG. 8 is another embodiment of a data track 104 formatted in accordance with the present invention. Data track 104 includes write address fields 106, read address fields 108 and data fields 110. The positions of write address fields 106 and read address fields 108 of FIG. 8 are reversed from the positions of read address fields 96 and write address fields 98 of FIG. 7. In FIG.

8, a magnetic transducing head moves in a direction indicated by arrow 112.

The present invention provides an offset address field which permits faster data transfer when writing information with a dual gap head which uses a rotary actuator. The present invention uses two address fields, one for use during readback of information and one for use when writing information. The address field used when writing information is offset from the data track. The degree of offset depends upon the skew angle introduced between the magnetic transducer and the data track. The offset is controlled by a controller in the magnetic disc storage system.

Although the present invention has been described with reference to preferred embodiments, workers skilled in the art will recognize that changes may be made in form and detail without departing from the spirit and scope of the invention. For example, the invention is useful with dual gap heads other than magnetoresistive heads.

What is claimed is:

1. A magnetic storage disc drive comprising:
a magnetic storage disc having plurality of information carrying tracks;
a dual gap magnetic transducer for reading and writing information on the magnetic storage disc;
a read address field incorporated in the information carrying tracks of the magnetic storage disc for carrying address information for use during a readback operation;
a write address field incorporated in the information carrying tracks of the magnetic storage disc and laterally offset from the read address field, the write address field for carrying address information for use during a write operation; and
a data field incorporated in the information carrying tracks of the magnetic storage disc, the data field substantially aligned with the read address field.

2. The magnetic storage disc drive of claim 1 wherein the write address field is positioned between the read address field and the data field.

3. The magnetic storage disc drive of claim 1 wherein the read address field is positioned between the write address field and the data field.

4. The magnetic storage disc drive of claim 1 wherein the dual gap magnetic transducer comprises a magnetoresistive read and inductive write magnetic head.

5. The magnetic storage disc drive of claim 1 including a rotary actuator coupled to the dual gap magnetic transducer for positioning the transducer over the information carrying tracks, and a controller for controlling operation of the rotary actuator wherein a read gap of the transducer is positioned adjacent the write address field prior to writing information in the data field.

6. The magnetic storage disc drive of claim 1 wherein the lateral offset of the write address field is a function of a skew angle between the dual gap magnetic transducer and the information carrying tracks.

7. The magnetic disc drive of claim 1 wherein lateral offset is a function of radial position of the information carrying track relative to the magnetic storage disc.

8. A magnetic disc storage system comprising:
a magnetic storage disc having a surface with
a plurality of information carrying tracks, the information carrying tracks having a plurality of read address fields, a plurality of write address fields and a plurality of data fields wherein read address fields are aligned with data fields and each write address field is positioned between a read address field and a data field and the write address field is laterally offset from the information carrying track;
a dual gap magnetic transducer adjacent the magnetic storage disc having a read gap for reading information on the information carrying tracks and having a write gap for writing information on the information carrying tracks of the magnetic storage disc;
a rotary arm coupled to the dual gap magnetic transducer for positioning the transducer adjacent data tracks of the magnetic storage disc whereby the dual gap magnetic transducer is movable through an arc over the surface of the magnetic storage disc which introduces a skew angle between the dual gap magnetic transducer and the information carrying tracks;
a rotary actuator coupled to the rotary arm for moving the rotary arm relative to the information carrying tracks; and
a disc controller connected to the rotary actuator for receiving commands and controlling the rotary actuator based upon received commands wherein the disc controller controls the rotary actuator to position the read gap over the write address field prior to writing information with the write gap in the data field.

9. The storage system of claim 8 wherein the lateral offset of the write address field is a function of a skew angle between the dual gap magnetic transducer and the information carrying tracks.

10. The apparatus of claim 8 wherein the dual gap magnetic transducer comprises a magnetoresistive read and an inductive write magnetic head.

11. A method of reading and writing information in a magnetic disc storage system having a magnetic storage disc with a plurality of information carrying tracks, the magnetic storage disc rotating adjacent a dual gap magnetic head, the method comprising:
positioning a read gap of the dual gap magnetic head adjacent a write address field prior to writing information on the storage magnetic disc, wherein the write address field is longitudinally offset from the information carrying track;
reading information relating to position which is contained in the write address field; and
writing information in a data field which follows the write address field, the data field generally aligned with the information carrying track whereby a write gap of the dual gap magnetic head is substantially aligned with the data field without repositioning the magnetic head following the step of reading information.

12. The method of claim 11 wherein positioning a read gap comprises laterally offsetting the dual gap magnetic head as a function of a skew angle between the dual gap magnetic head and the information carrying track of magnetic storage disc.

13. The method of claim 11 wherein positioning a read gap comprises offsetting the dual gap magnetic head as a function of radial position of an information carrying track relative to the magnetic storage disc.

14. The method of claim 11 and further comprising:
positioning the read gap of the dual gap magnetic head adjacent a read address field prior to reading information from the magnetic storage disc, wherein the read address field is generally longitudinally aligned with the information carrying track;
reading information relating to position which is contained in the read address field; and reading information in the data field, which follows the read address field, whereby the read gap of the dual gap magnetic head is substantially aligned with the data field without repositioning the magnetic head following the step of reading information from the read address field.

15. A magnetic disc storage system comprising:

a magnetic storage disc having a surface with a plurality of information carrying tracks, the information carrying tracks having a plurality of read address fields, a plurality of write address fields and a plurality of data fields wherein read address fields are aligned with data fields and each read address field is positioned between a write address field and a data field and the write address field is laterally offset from the information carrying track;

a dual gap magnetic transducer adjacent the magnetic storage disc having a read gap for reading information on the information carrying tracks and having a write gap for writing information on the information carrying tracks of the magnetic storage disc;

a rotary arm coupled to the dual gap magnetic transducer for positioning the transducer adjacent data tracks of the magnetic storage disc whereby the dual gap magnetic transducer is movable through an arc over the surface of the magnetic storage disc which introduces a skew angle between the dual gap magnetic transducer and the information carrying tracks;

a rotary actuator coupled to the rotary arm for moving the rotary arm relative to the information carrying tracks; and a disc controller connected to the rotary actuator for receiving commands and controlling the rotary actuator based upon received commands wherein the disc controller controls the rotary actuator to position the read gap over the write address field prior to writing information with the write gap in the data field.

16. The storage system of claim 15 wherein the lateral offset of the write address field is a function of a skew angle between the dual gap magnetic transducer and the information carrying tracks.

17. The apparatus of claim 15 wherein the dual gap magnetic transducer comprises a magnetoresistive read and an inductive write magnetic head.

* * * * *